United States Patent
Maltsev et al.

(10) Patent No.: US 9,820,250 B2
(45) Date of Patent: Nov. 14, 2017

(54) SUPPORT FOR ASYNCHRONOUS TIME DIVISION DUPLEXING IN ADJACENT CELLS OF A WIRELESS COMMUNICATION SYSTEM

(75) Inventors: Alexander Maltsev, Nizhny Novgorod (RU); Alexei Davydov, Nizhny Novgorod (RU); Gregory Morozov, Nizhny Novgorod (RU); Ilya Bolotin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 640 days.

(21) Appl. No.: 13/994,744

(22) PCT Filed: Aug. 8, 2012

(86) PCT No.: PCT/US2012/050007
§ 371 (c)(1),
(2), (4) Date: Sep. 16, 2013

(87) PCT Pub. No.: WO2013/025419
PCT Pub. Date: Feb. 21, 2013

(65) Prior Publication Data
US 2014/0003270 A1    Jan. 2, 2014

Related U.S. Application Data

(60) Provisional application No. 61/523,080, filed on Aug. 12, 2011.

(51) Int. Cl.
*H04L 12/26*    (2006.01)
*H04W 56/00*    (2009.01)
(Continued)

(52) U.S. Cl.
CPC .......... *H04W 56/0045* (2013.01); *H04B 3/36* (2013.01); *H04B 7/0413* (2013.01);
(Continued)

(58) Field of Classification Search
CPC ....................................................... H04W 52/34
(Continued)

(56) References Cited

U.S. PATENT DOCUMENTS 8,229,447 B2 *  7/2012  Furuya ................ H04W 52/146
                                                                455/450
8,478,342 B2 *  7/2013  Vedantham ............ H04B 7/024
                                                                455/452.1
(Continued)

FOREIGN PATENT DOCUMENTS

CN    101924586 A    12/2010
CN    102111246 A    6/2011
(Continued)

OTHER PUBLICATIONS

International Preliminary Report on Patentability with Written Opinion received for PCT Patent Application No. PCT/US2012/050007 dated Feb. 27, 2014, 8 pages.
(Continued)

*Primary Examiner* — Guang Li
(74) *Attorney, Agent, or Firm* — Thorpe North & Western

(57) ABSTRACT

Technology is discussed for mitigating interference in a wireless communication environment where adjacent cells can have asynchronous Time Division Duplexing configurations. Measurements can be taken at an illuminated evolved Node B (eNodeB) of DownLink (DL) transmissions from a transmit eNodeB. These measurements can be relayed to the transmit eNodeB over a backhaul link and used to make scheduling, transmission power, and/or beam forming decisions to reduce the potential for DL interference. To reduce UpLink (UL) interference, sub-frame specific measurements can be requested by a transmit eNodeB of a User Equipment (UE) that would receive DL transmission from the transmit eNodeB to detect interference from any UEs performing UL transmission to an adjacent eNo-
(Continued)

deB. The interference measurements can be used by the transmit eNodeB to make scheduling determinations to mitigate the interference.

24 Claims, 12 Drawing Sheets

(51) Int. Cl.
| | |
|---|---|
| H04W 52/34 | (2009.01) |
| H04L 5/00 | (2006.01) |
| H04W 24/02 | (2009.01) |
| H04L 1/00 | (2006.01) |
| H04B 3/36 | (2006.01) |
| H04B 7/0413 | (2017.01) |
| H04L 1/18 | (2006.01) |
| H04W 76/04 | (2009.01) |
| H04W 48/12 | (2009.01) |
| H04W 52/14 | (2009.01) |
| H04W 52/24 | (2009.01) |
| H04B 7/024 | (2017.01) |
| H04W 16/14 | (2009.01) |
| H04W 84/04 | (2009.01) |

(52) U.S. Cl.
CPC .......... *H04L 1/0003* (2013.01); *H04L 1/0026* (2013.01); *H04L 1/1812* (2013.01); *H04L 5/001* (2013.01); *H04L 5/0032* (2013.01); *H04L 5/0057* (2013.01); *H04L 5/0073* (2013.01); *H04L 5/0091* (2013.01); *H04W 24/02* (2013.01); *H04W 48/12* (2013.01); *H04W 52/34* (2013.01); *H04W 76/046* (2013.01); *H04B 7/024* (2013.01); *H04W 16/14* (2013.01); *H04W 52/146* (2013.01); *H04W 52/241* (2013.01); *H04W 84/045* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 8,761,097 B2* | 6/2014 | Vajapeyam | ........... | H04W 16/10 370/329 |
| 8,774,092 B2* | 7/2014 | Vajapeyam | ......... | H04W 72/082 370/328 |
| 9,008,018 B2* | 4/2015 | Sirotkin | ................ | H04L 1/0026 370/329 |
| 9,014,707 B2* | 4/2015 | Shin | ...................... | H04W 16/32 370/229 |
| 9,014,735 B2* | 4/2015 | Kawasaki | ......... | H04W 72/1231 455/501 |
| 2007/0280096 A1* | 12/2007 | Yanover | ................ | H04W 52/04 370/201 |
| 2009/0131065 A1* | 5/2009 | Khandekar | ......... | H04W 72/082 455/452.1 |
| 2009/0197631 A1 | 8/2009 | Palanki et al. | | |
| 2009/0201860 A1* | 8/2009 | Sherman | ............. | H04L 12/1881 370/329 |
| 2009/0239540 A1* | 9/2009 | Yoneta | ................ | H04W 72/082 455/436 |
| 2010/0054196 A1* | 3/2010 | Hui | ...................... | H04W 16/00 370/329 |
| 2010/0220597 A1* | 9/2010 | Ji | .......................... | H04W 16/10 370/241 |
| 2011/0002270 A1* | 1/2011 | Himayat | ................. | H04L 12/66 370/328 |
| 2011/0038328 A1* | 2/2011 | Wang | ................ | H04W 72/0413 370/329 |
| 2011/0038329 A1* | 2/2011 | Luo | ....................... | H04L 1/1854 370/329 |
| 2011/0134746 A1* | 6/2011 | Liu | ............................. | H04J 1/12 370/201 |
| 2011/0310747 A1* | 12/2011 | Seo | ...................... | H04B 7/2606 370/246 |
| 2012/0122440 A1* | 5/2012 | Krishnamurthy | ..... | H04L 5/0053 455/418 |
| 2012/0201152 A1* | 8/2012 | Yoo | ...................... | H04B 17/345 370/252 |
| 2012/0281657 A1* | 11/2012 | Ding | ................. | H04W 72/0426 370/329 |
| 2012/0329498 A1* | 12/2012 | Koo | ...................... | H04J 11/005 455/501 |
| 2013/0010713 A1* | 1/2013 | Folke | .................. | H04W 72/085 370/329 |
| 2013/0170387 A1* | 7/2013 | Wang | .................... | H04W 4/005 370/252 |
| 2013/0208686 A1* | 8/2013 | Zhang | ................. | H04J 11/0056 370/329 |
| 2013/0279343 A1* | 10/2013 | Jeong | .................... | H04W 24/10 370/241 |
| 2013/0316700 A1* | 11/2013 | Beale | .................. | H04W 72/082 455/423 |

FOREIGN PATENT DOCUMENTS

| | | |
|---|---|---|
| WO | WO 2007/112371 A1 | 10/2007 |
| WO | 2013/025419 A1 | 2/2013 |

OTHER PUBLICATIONS

International Search Report and Written Opinion received for PCT application No. PCT/US2012/050007, dated Jan. 22, 2013, 11 pages.

\* cited by examiner

SUPPORT FOR ASYNCHRONOUS TIME DIVISION DUPLEXING IN ADJACENT CELLS OF A WIRELESS COMMUNICATION SYSTEM

RELATED APPLICATIONS

This application claims the benefit of and hereby incorporates by reference U.S. Provisional Patent Application Ser. No. 61/523,080, filed Aug. 12, 2011.

BACKGROUND

Wide area wireless networks are typically comprised of a cellular radio tower (tower) that is used to communicate with wireless devices over a geographic area referred to as a cell. Many wireless communication specifications employ some form of Time Division Duplexing (TDD) to schedule Down Link (DL) traffic from a tower to one or more wireless devices operating within the cell. TDD is also used to schedule Up Link (UL) traffic from one or more wireless devices within a cell controlled by the tower over common frequency resources.

The Third Generation Partnership Project (3GPP) Long Term Evolution (LTE) specifications provide one example of such specifications that accommodate TDD. An additional specification is the Institute of Electronics and Electrical Engineers (IEEE) 802.16 specification, commonly referred to as WiMax.

To accommodate both DL and UL traffic within the same cell, a TDD configuration can be employed. A TDD configuration provides different time slots for UL and DL transmissions with respect to a common tower. By assigning UL and DL transmission to different time slots, destructive interference, which would otherwise occur if UL and DL transmissions occurred at the same time, can be avoided.

In a wireless network, different towers can experience different demands for DL and UL traffic. For example, there might be a much greater demand for DL traffic at one tower. Whereas, in an adjacent tower, there may be more demand for UL traffic relative to the first tower. To improve efficiency, therefore, it would be desirable to allocate more UL time for the adjacent tower. However, doing so runs the risk of subjecting UL transmissions to interference from more powerful DL transmissions from the original tower near a mobile device.

The interference caused by downlink transmissions is not the only type of interference that can be a problem where nearby towers have asymmetric UL and DL transmission configurations. Another example of a problematic type of interference occurs where one tower is configured to receive UL transmission from wireless devices associated with this tower. However, a nearby tower is configured to provide DL transmission to additional wireless devices associated with this nearby tower. If one or more of the wireless devices receiving DL transmission are sufficiently close to the wireless devices transmitting on the UL, the UL transmissions from the UL wireless devices can interfere with the DL reception of the other wireless devices.

Additionally, to improve spectral efficiency, recent wireless specifications, such as those for LTE, allow for the deployment of Low Power Node (LPN) cellular radio stations within a cell covered by a high power cellular radio tower, which can be referred to as a MaCro Node (MCN). LPNs and MCNs can be part of a heterogeneous network. The interference that can be experienced with respect to these LPNs within the cell of the MCN can be greater than that experienced within an adjacent cell.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
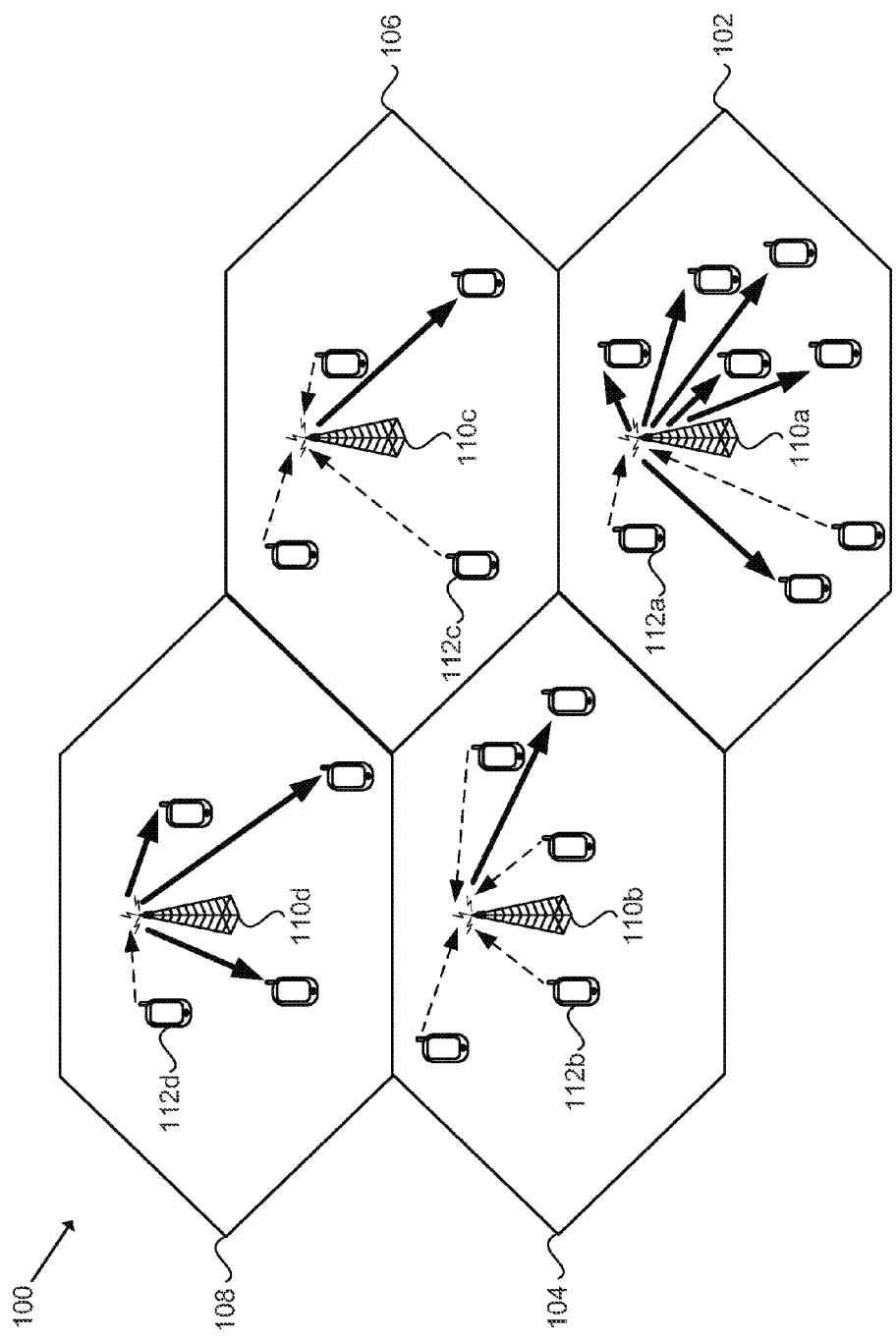
FIG. 1 is a block diagram illustrating a network of evolved Node B (eNodeB) towers in a wireless communications environment having coverage cells with asymmetric directional traffic in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

Different terminology for wireless devices is used in different specifications. As used herein, a wireless device can be a User Equipment (UE) or a Mobile Station (MS). Throughout this application, the term UE can be used interchangeably with the term MS.

As used herein a cellular radio tower is a wireless communication device in a wide area wireless network configured to communicate with a plurality of wireless devices located within a geographic region referred to as a cell. Different terminology for cellular radio towers is used in different specifications. Terminology used for different variations of a cellular radio tower can include, but is not limited to, a Base Station (BS) and an evolved Node B (eNodeB or eNB). The terms are used interchangeably, unless otherwise noted. The actual definition of a BS or eNB is provided in their IEEE 802.16 and 3GPP LTE specifications. As an important statement of the generality of embodiments discussed in this disclosure, while the terminology of the Third Generation Partnership Project (3GPP) Long Term Evolution (LTE) standard is often used throughout this specification, it is not intended to be limiting, and there are exceptions in the use of more general terminology in portions of this specification to further communicate this point.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term 'adjacent' can mean abutting, but can also mean sufficiently near that the interference between adjacent elements is a significant concern, regardless of any intervening elements.

As used herein, the term 'null,' can refer to a complete null, but can also refer to a region of reduced radiated power.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an example of a wireless communications environment 100 with asynchronous directional traffic demands, or non-uniform cell loading. The wireless communication environment 100 is comprised of multiple different cells 102-108. Each cell is comprised of a geographic region over which the respective evolved Node B (eNodeB or eNB) 110a-110d can communicate with wireless devices.

The eNodeBs 110a-110d of the various cells 102-108 are configured to support both Up Link (UL) and Down Link (DL) transmissions from and to one or more units of User Equipment (UE) 112a-112d within the various corresponding cells. To accommodate UL and DL transmissions, the wireless communication environment 100 relies on Time Division Duplexing (TDD) to separate transmissions from the eNodeBs to UEs, referred to as DL transmissions, and transmissions from the UEs to the eNodeBs, referred to as UL transmissions. TDD can be used to assign UL and DL transmissions to different time slots. By assigning UL and DL transmissions to different time slots, interference between the transmissions can be avoided.

Each cell 102-108 contains a number of arrows to and from various UEs 112a-112d located within each cell. The thin, dashed arrows pointing toward the eNodeBs 110a-110d represent an average amount of time spent in UL transmission for a given time. Similarly, the thick, solid arrows pointing away from the eNodeBs to the UEs represent an average amount of time spent in DL transmission for the given time. Therefore, the relative number of UL arrows to DL arrows depicts the relative amount of directional traffic, in terms of DL and UL transmissions, that each cell 102-108 experiences over the given amount of time.

TDD communication is typically accomplished using versions of Orthogonal Frequency Division Multiplexing (OFDM). The DL transmissions within TDD communications are achieved directly by a OFDM scheme. UL transmissions are achieved by a Single Carrier-Frequency Division Multiple Access (SC-FDMA) modulation scheme. Since SC-FDMA just involves an additional Discrete Fourier Transform preceding conventional Orthogonal Frequency Division Multiple Access (OFDMA), SC-FDMA can be thought of as a linearly pre-coded OFDMA scheme. Additionally, since OFDMA is simply a multi-user version of OFDM, SC-OFDMA is simply a version of OFDM and has resource elements defined with respect to the same times and frequencies as OFDM.

In OFDM, communication resources, which can be referred to as timeslots in TDD, can be allocated to either uplink or downlink. Two of the cells depicted 102, 108 experience a markedly greater load of DL traffic relative to the two other cells depicted 104, 106. Over a given amount of time, each cell can experience different amounts of DL and UL directional traffic. Therefore, efficient use of temporal resources would dictate the use by each cell of a different amount of time slots dedicated to UL transmissions and to DL transmissions. The allocation of different numbers of time slots to DL and UL directional traffic for a given amount of time can be considered a TDD configuration.

Figure 2:
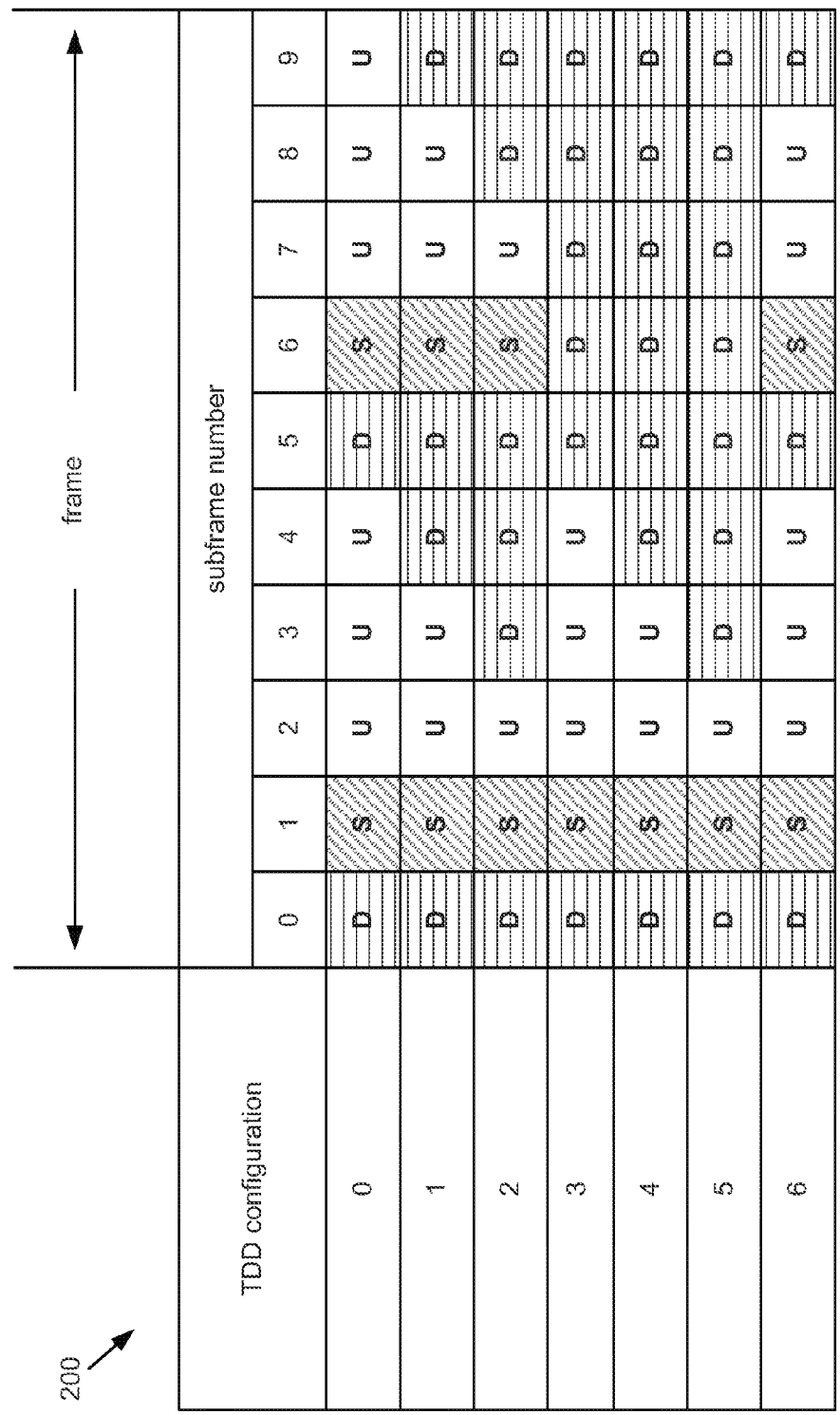
FIG. 2 is a table of one example of potential Time Division Duplexing (TDD) configurations in accordance with an example.

FIG. 2 depicts a table 200 of possible TDD configurations in accordance with one example of a wireless communication network. This example is not intended to be limiting. A number of different TDD configurations may be used, depending on network configuration, network usage load, and other features, as can be appreciated. The table depicts TDD configurations specified for Release 9 of the Third Generation Partnership Project (3GPP) Long Term Evolution (LTE) standards. However, other approaches to TDD configurations are possible.

In the table 200, each configuration of the seven TDD configurations occupies a frame, which corresponds to 10 ms of transmission time. After the time required for frame transmission elapses, a chosen TDD configuration can be repeated. Each frame can comprise ten 1 ms sub-frames. Each sub-frame can correspond to a time slot.

Accordingly, each sub-frame can be allocated for either UL transmission, indicated in FIG. 2 with a 'U,' or DL transmission, indicated by a 'D.' Certain sub-frames can also be allocated for special transmission periods, indicated by a 'S,' such as those for Downlink Pilot Time Slot (DwPTS), Guard Period (GP), and Uplink Pilot Time Slot UpPTS transmissions. As can be appreciated, each TDD configuration corresponds to a different pattern of DL and UL transmission allocations with differing amounts of allocations for UL transmissions relative to DL transmissions. These differing patterns lead to the potential interference types between adjacent cells with eNodeBs with differing TDD configurations.

Figure 3:
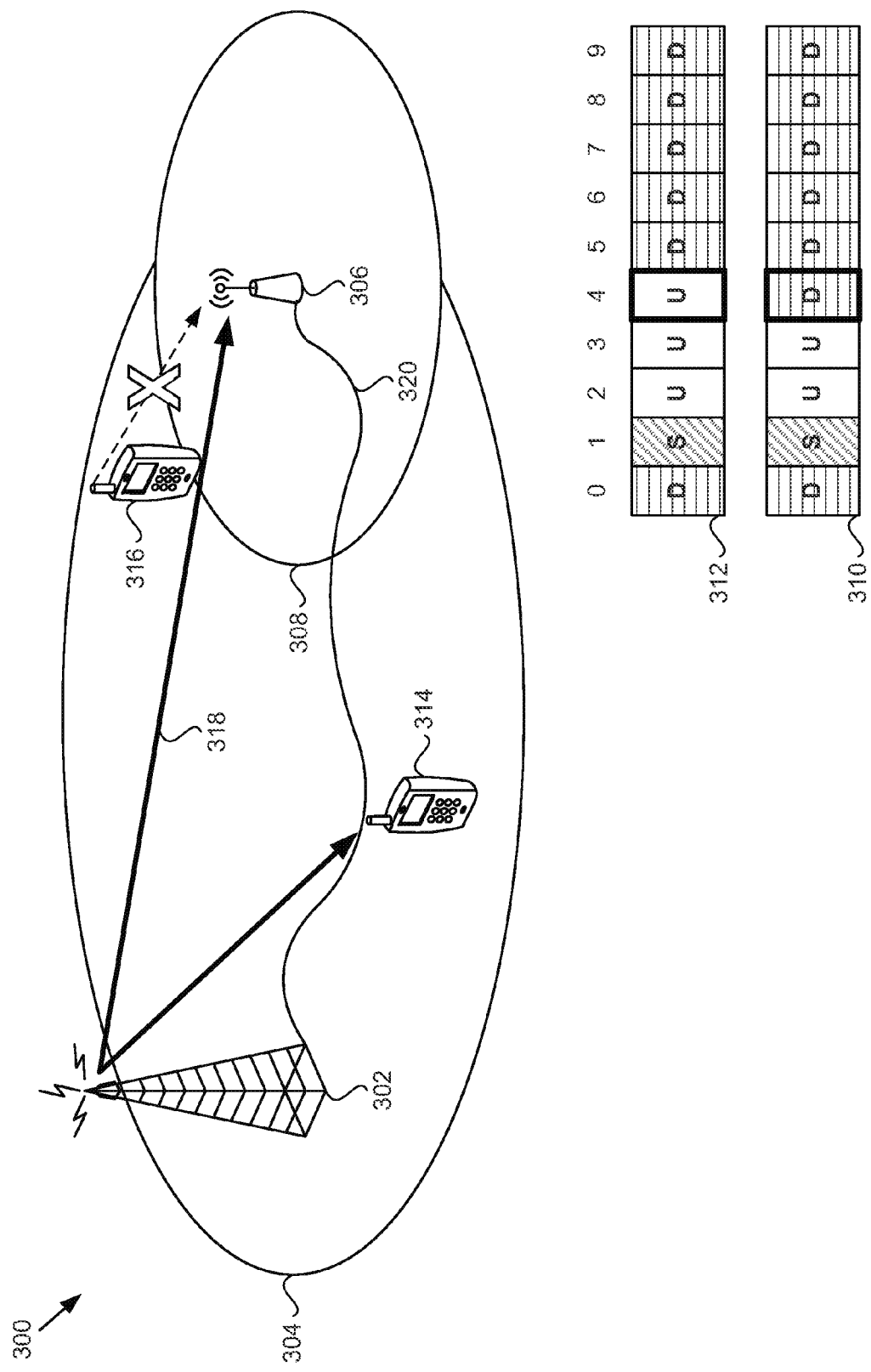
FIG. 3 is a block diagram illustrating interference between a Down Link (DL) transmission from one eNodeB and an Up Link (UL) transmission from a User Equipment (UE) wireless device associated with another eNodeB in accordance with an example.

FIG. 3 illustrates one example 300 of one type of interference that can result from differing TDD configurations. In the example, a MaCro-Node (MCN) eNodeB 302 has a portion of its coverage area (i.e. cell) 304 with a Low Power Node (LPN) eNodeB 306 included therein. The LPN can be, without limitation, an eNodeB configured to provide coverage over a smaller geographic region, or small cell. An LPN can be a micro cell, pico cell, femto cell, a home eNodeB cell (HeNB), a Remote Radio Head (RRH), a Remote Radio Equipment (RRE), and a repeater. The LPN eNodeB has its own LPN coverage area (cell) 308 within the coverage area of the MCN eNodeB.

In the example 300, the MCN 302 is configured with a TDD configuration 310 specific to the MCN and corresponding to TDD configuration 4 in table 200 of FIG. 2, while the LPN 306 is configured with a TDD configuration 312 specific to the LPN and corresponding to TDD configuration 3 in the table. These two table configurations have different allocations for DL and UL transmissions at sub-frame 4, as indicated by the bold outline of these sub-frames of the two different TDD configurations.

Both the MCN 302 and the LPN 306 are depicted in FIG. 3 during transmissions as they are carried out respectively for the two eNodeBs at sub-frame 4. In accordance with TDD configuration 4, the MCN eNodeB is performing a DL transmission, indicated by the bold, solid arrows, to be received by a first UE 314 associated with the MCN. Similarly, the LPN receives an UL transmission, indicated by the thin, dashed arrow, from a second UE 316 associated with the LPN.

Unfortunately, however, as indicated by the bold, solid arrow 318 from the MCN 302 to the LPN 306, the DL transmission from the MCN can have a relatively high power, relative to the UL transmission power, within the LPN coverage area 308, a portion of which is located within the coverage area 304 of the MCN. The power of the DL transmission from the MCN can be much greater than that of the relatively small UL power from the UE. As indicated by the 'X' on the UL transmission from the second UE 316, the DL can cause significant interference to the UL transmission of the second UE.

Although FIG. 3 illustrates an example 300 with a heterogeneous wireless network environment, in which UL transmissions to an LPN 306 encounter significant interference from DL transmissions from an MCN 302 with a differing TDD configuration, this type of interference can also occur between MCNs of adjacent cells, similar to those of FIG. 1. This is especially true when a UE sends an UL transmission from the boundary with another cell in which the corresponding MCN is configured for DL transmission at the same time. Therefore, the type of interference depicted in FIG. 3 is applicable to both heterogeneous and homogeneous networks. Additionally, such DL interference further complicates heterogeneous environments with even more high power node and low power node elements than those depicted in FIG. 3.

To address the need to accommodate non-uniform UL and DL loading within cells of adjacent towers in a TDD environment, new approaches and protocols are needed that are capable of supporting different TDD configurations in adjacent cells to accommodate asymmetric UL/DL directional traffic. These new methods and protocols need to be robust and reliable. Furthermore, they need to accommodate increasing demands and changes while making use of pre-existing and/or forthcoming infrastructure and hardware.

In addressing this first type of DL interference, the DL transmission from the MCN 302, as it is received 318 at the LPN 306, can be viewed as a radio link between the MCN and the LPN. The LPN can measure the strength of the DL transmission from the MCN as it is received at the LPN. To take this measurement, the LPN can measure the strength of one or more Reference Signals (RS) within the DL transmission. The RS can include, without limitation, Channel State Information RSs (CSI-RS) and Cell-specific RSs (CRS), as defined in Release 10 of the 3GPP LTE specifications. The LPN can also take other forms of channel measurements for the link, including Channel Quality Indicators (CQI).

The LPN 306 can convey one or more measurements over a backhaul link 320 to the MCN 302. The backhaul link can comprise an X-2 interface. Additionally, the backhaul link can include a low latency link, such as a fiber optic cable, a broadband wired cable, or other type of broad band communication. Such low-latency cables are being deployed with ever greater frequencies within wireless networks. The large increases in available bandwidth of such low-latency cables can be leveraged to send such measurements and other related information with sufficient frequency to provide the MCN with near-real time information about interference it may be causing in the region of the LPN without overloading the backhaul link.

The LPN 306 can also generate an interference message indicating a need for the MCN 302 to take action with respect to the DL transmission as received 318 at the LPN. Such an interference message can also include, without limitation, information, such as a channel measurement, a reference signal received power, a quantized principle eigen vector(s) of an estimated channel, and a pre-coding matrix indicator of a codebook, among other possibilities.

To assist in acquiring accurate measurements of the DL transmissions 318 from the MCN 302 at the LPN 306, the LPN can request that one or more UEs within its coverage area 308 perform a muting pattern. For example, the second UE 316 depicted in FIG. 3 can be requested to perform a muting pattern. The muting pattern can be configured to mute UL transmissions from one or more UEs during times and at frequencies corresponding to those at which the LPN makes its measurements of the DL transmissions 318 of the MCN. In this way, transmission from the one or more UEs is configured to avoid causing interference with RSs of the MCN DL transmission so that the LPN can make accurate measurements. These accurate measurements can be used to reduce the influence of any interference of DL transmissions from the MCN on UL transmissions received at the LPN.

The accurate measurements can be used to identify when power reduction, spatial beam redirection, or muting of selected Resource Elements (RE) at a high power node, such as an MCN, can be used to reduce the interference received at the LPN during a selected TDD time frame. In another embodiment, one or more uplink signals sent from UE(s) to an eNodeB can be modified to reduce interference received at the eNodeB, such as a high power node or an LPN.

Figure 4:
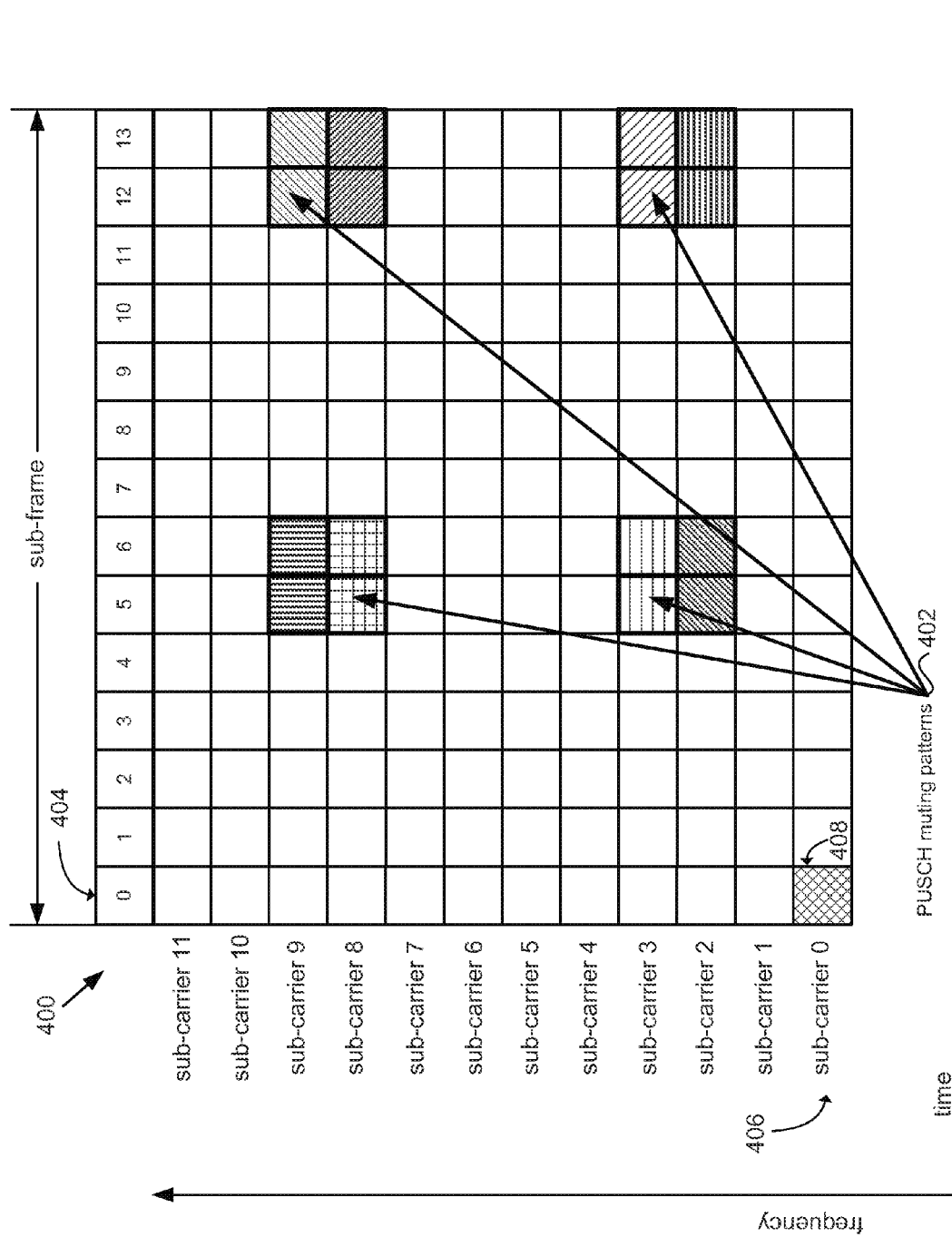
FIG. 4 is a block diagram illustrating Resource Elements (RE) within an UL transmission from a UE in communication with an eNodeB that is measuring Reference Signals (RS) in the DL transmission from a DL eNodeB, where the REs correspond to the RSs, in accordance with an example.

FIG. 4 illustrates one example of power reduction patterns 402 to be applied at one or more UEs consistent with certain examples. The power reduction patterns depicted in FIG. 4 is depicted with respect to a sub-frame 400 consistent with 3GPP LTE Release 10, which employs an Orthogonal Frequency Division Multiplexing (OFDM) modulation scheme. However, the power reduction patterns can be implemented consistent with any number of wireless specifications, and FIG. 4 is provided by way of example, not limitation. The REs 402 may be broadcast with a reduced power to reduce the interference received at an illuminated eNodeB (i.e. the eNodeB with which the UE(s) are communicating). Reference throughout this specification to an "illuminated eNodeB" means an eNodeB that receives, or is illuminated by, DL transmissions from an adjacent eNodeB. Alternatively, the REs 402 may be muted, thereby enabling the illuminated eNodeB to receive a DL signal during a selected TDD time frame with no interference from an adjacent high power node. This will be discussed more fully below.

The sub-frame 400 is divided, with respect to time, into 14 different symbol columns (0-13, symbol column 0 is numbered 404 for purposes of illustration) and, with respect to frequency, into 12 different sub-carriers rows (sub-carrier 0-11, sub-carrier row 0 is numbered 406 for purposes of illustration) to create a grid of REs, of which a particular RE 408 is depicted with a bi-directional diagonal crosshatch for purposes of illustration. Each RE is capable of carrying one modulated symbol. Each modulated symbol can carry one or more bits of data depending on the modulation scheme employed or reference signal. A sub-frame can be associated with more or fewer sub-carriers, but 12 sub-carriers are depicted in FIG. 4 as much as this number of sub-carriers are associated with a Resource Block (RB) within 3GPP LTE Release 10. Each sub-frame in 3GPP LTE Releases 8, 9, 10, and 11 comprises multiple RBs with multiple sub-carriers therein.

Within an LTE heterogeneous network, UL and DL transmissions with respect to various eNodeBs can be synchronized, as in other wireless standards. Therefore, an RE with a particular transmission time and sub-carrier frequency range at one eNodeB can have a corresponding RE with a similar transmission time and sub-carrier at an adjacent eNodeB. As a corollary, RSs in a DL transmission from a transmit eNodeB that are used to measure the strength and/or other properties of the DL transmission at an illuminated eNodeB can have corresponding REs in the UL transmission received from one or more UEs at the illuminated eNodeB. Reference throughout this specification to a "transmit eNodeB" means an eNodeB that transmits a DL transmission with a potential to interfere with a transmission at another eNodeB. In order to accurately measure the DL transmission from the adjacent, transmit eNodeB, it can be helpful to eliminate potential interference, such as UL signals received at an eNodeB from UE's at the same time that the DL transmission is received at the illuminated eNodeB. By muting these UL signals, potentially by Physical UL Shared CHannel (PUSCH) muting, interference can be mitigated from the UL transmissions of the UEs on the RSs to be measured in the DL transmission from the adjacent, transmit eNodeB.

In the example of FIG. 4, a sub-frame 400 for a Physical Uplink Shared Channel (PUSCH), as defined in any of 3GPP LTE Releases 8 through 10, is illustrated. The power reduction patterns 402, which can also be muting patterns, can be applied to the UL transmissions of the UEs to reduce or eliminate interference at a time/frequency when a DL transmission is measured at an illuminated eNodeB. The power reduction/muting can be applied to REs which correspond to the same frequency/time location of RSs in the DL transmission.

Since the RSs are repeated in a common pattern from one sub-frame to another, power reduction/muting of REs in the UL transmissions from one or more UEs can also be periodic to mitigate interference during measurement at an illuminated eNodeB. In FIG. 4, arrows point to various REs in the PUSCH transmissions from one or more UEs to an illuminated eNodeB. The patterns can correspond to RS patterns in the DL transmission.

As indicated by the different cross-hatching in these REs, different transmission configurations for the reference singles for the transmit eNodeB can correspond to different RE patterns and/or combinations of patterns.

Information about the RS pattern and/or patterns of the transmit eNodeB can be known apriori by the illuminated eNodeB and/or communicated to the illuminated eNodeB over a backhaul link. The illuminated eNodeB can then communicate this pattern to one or more UEs as a power reduction/muting pattern 402 to avoid transmission interference from these UEs at the times and frequencies for which the illuminated eNodeB performs its measurements. In embodiments employing an LTE wireless system, the illuminated eNodeB can provide, without limitation, Radio Resource Control (RRC) signaling for the one or more UEs to indicate on which REs in selected UL sub-frames the muting/power reduction should be applied, including the periodicity of such sub-frames. The RRC signaling can include the muting pattern, or set of REs to be reduced/muted, within the sub-frame(s). In other words, the RRC signaling can indicate which REs are to be muted, or reduced in power, within one physical resource block of the appropriate sub-frame, as can be repeated periodically.

Once the measurements of the downlink signal have been made, a determination can be made as to whether some action is necessary to reduce interference at the illuminated eNodeB. This determination can be made at the illuminated eNodeB and conveyed to the transmit eNodeB. This determination can also be made at the transmit eNodeB with information, based on measurements made by the illuminated eNodeB and conveyed from the illuminated eNodeB to the transmit eNodeB. As previously discussed, the measurements can be conveyed from the illuminated eNodeB to the transmit eNodeB via a backhaul link. When a determination is made that action needs to be taken to reduce interference, several approaches can be taken.

Figure 5:
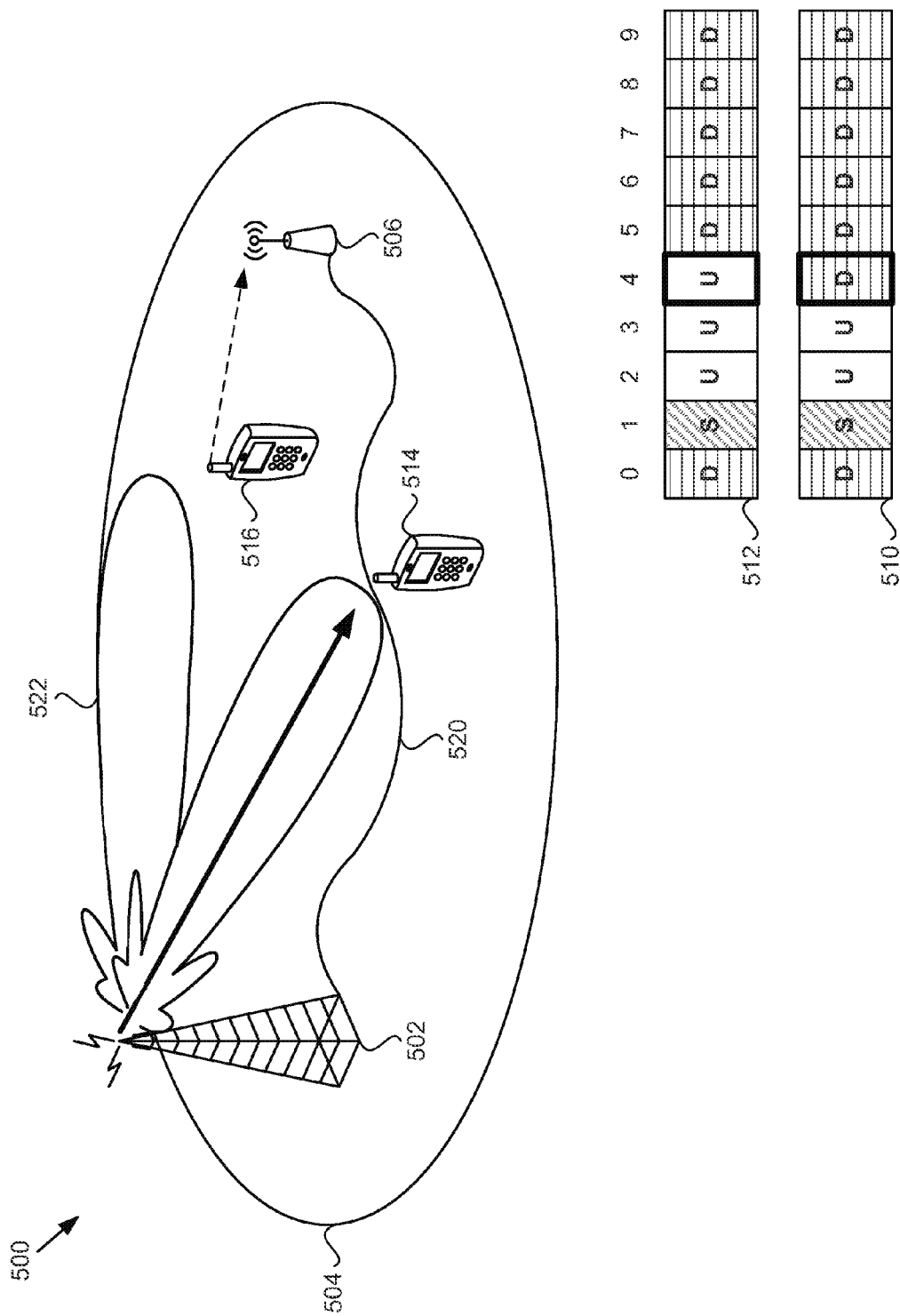
FIG. 5 is a block diagram illustrating the use of beam forming with a null in the direction from a DL eNodeB to an illuminated eNodeB to reduce interference between differing TDD configurations in accordance with another example.

FIG. 5 illustrates an approach 500 to reduce interference employing beam forming to create a reduction in radiated power in the direction of a wireless device receiving potential interference. In FIG. 5, a transmit/DL MCN eNodeB 502 performs a DL transmission (thick, solid arrow) to one or more UEs 514 within a portion of the coverage area 504 of the MCN. Also within the coverage area of the MCN is an LPN eNodeB 506. In additional embodiments, the LPN may be an MCN, configured to receive an UL transmission (thin, dashed arrow) from a UE 516.

A downlink transmission from the MCN 502 and a UL transmission from the UE 516 are depicted during sub-frame 4 with respect to the TDD configurations at the MCN 502 and the LPN 506. Since the TDD configuration 512 of the LPN corresponds to TDD configuration 3 of the table 200 of FIG. 2 and the TDD configuration 510 of the MCN corresponds to TDD configuration 4 of the table, the transmission direction differs at sub-frame 4. As before, in certain embodiments, the LPN can be an adjacent MCN. Also, many eNodeBs can receive interference from one DL eNodeB. Reference throughout this specification to a "DL eNodeB" means an eNodeB that transmits a DL transmission with a potential to interfere with activities of another eNodeB. However, in FIG. 5, the MCN applies beam forming to create a beam pattern 522 with reduced radiated power, or a null, in the direction of the LPN. The reduced radiated power, or null, in the direction of the LPN can be used to mitigate the potential for interference at the LPN from the DL transmission of the MCN relative to the UL transmission of the UE 516.

For purposes of illustration, and not by way of limitation, embodiments consistent with aspects of 3GPP LTE Release 10 specifications can make use of the Automatic Neighbor Relation Function (ANRF) to obtain an E-UTRAN Cell Global Identifier (ECGI) to determine the direction in which to reduce radiated power. Information obtained during the setup of an X2 interface can also be employed to determine the direction of a null for the beam pattern 522. The beam pattern may be formed by any of the beam forming methods set forth in various wireless communication specifications, including those for 3GPP LTE Releases 8 through 10.

In certain embodiments, the beam pattern 522 is only formed for sub-frames where measurements performed at the LPN 504 indicate significant interference. In alternative embodiments, the beam pattern may be formed more generally, covering time periods where it may not be necessary. Additionally, the measurements received from the LPN 506 can be used to make changes in the TDD configuration 510 at the MCN 502. The measurements can also be used to reduce the overall power of transmission during conflicting sub-frames and to generate Almost Blank Sub-frames (ABS), as defined in 3GPP LTE Release 10.

Furthermore, any combination of the foregoing techniques of beam forming, TDD configuration alteration, overall power reduction, and ABS transmission, can be applied in response to one or more measurements received from the LPN 506 as part of a scheduling determination made by the MCN 502 of as requested by the MCN. To make such scheduling determinations, the MCN can rely on interference information, received over a backhaul link 520, from the LPN. The interference information can provide information about channel state information on the DL between the MCN and the LPN, as measured at the LPN. However, interference with UL transmissions caused by strong DL transmission signals is not the only kind of interference that can arise from differing TDD configurations in adjacent cells.

Figure 6:
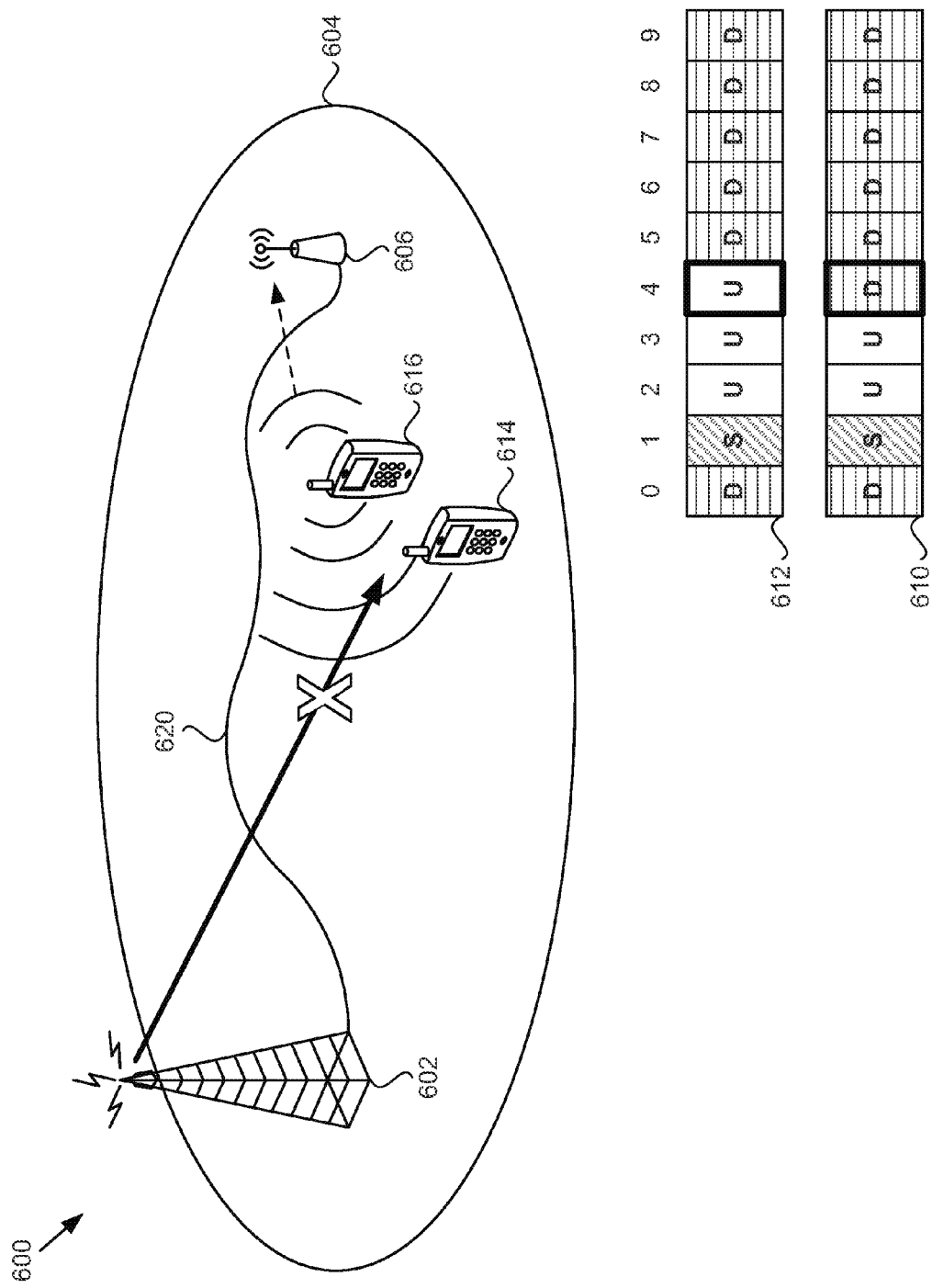
FIG. 6 is a block diagram illustrating interference on a DL transmission as received by a UE associated with a DL eNodeB because of an UL transmission from a UE to a UL eNodeB in accordance with another example.

FIG. 6 depicts an example 600 of an additional interference type that can arise from UL transmissions from a UE due to differing TDD configurations. FIG. 6 also depicts a transmit/DL MCN eNodeB 602 performing a DL transmission (thick, solid arrow) to one or more UEs 614. Similarly, FIG. 6 also depicts an LPN eNodeB 606 within a portion of the coverage area 604 of the MCN. The LPN is also receiving an UL transmission from UE 616. The received UL transmission at the LPN may also experience interference from the DL transmission of the MCN, due to the conflicting transmission directions of the TDD configuration 610 of the MCN and the TDD configuration 612 of the LPN. However, in FIG. 6, a focus is placed on the interference that the UL transmission from the UE 616 may cause to the reception of the DL transmission at the UE 614, indicated by the 'X' on the arrow for the DL transmission from the MCN.

Although UL transmissions from a UE can be weaker than DL transmissions from an eNodeB, they can still cause interference with the reception of another UE located within hundreds of meters of a transmitting UE. As used herein, the term "UL transmitting UE" refers to a UE configured to send a UL signal to a node at a selected period in time. The term "DL receiving UE" refers to a UE configured to receive a DL signal from a node at a selected period in time.

Since the UL transmitting UE 616 is sufficiently close to the DL receiving UE 614 in FIG. 6, the UL transmission from the UL transmitting UE can interfere with the DL transmission received at the DL receiving UE 614 when the UL and DL transmissions occur at the same period in time. However, if the UL transmitting UE were sufficiently distant from the DL receiving UE, there is typically minimal interference, regardless of differing transmission directions. Therefore, eliminating a DL transmission and/or sub-frames to the DL receiving UE on every sub-frame for which there is a conflicting DL transmission direction on another eNodeB, particularly in heterogeneous environments with many adjacent eNodeBs, can be inefficient.

Figure 7:
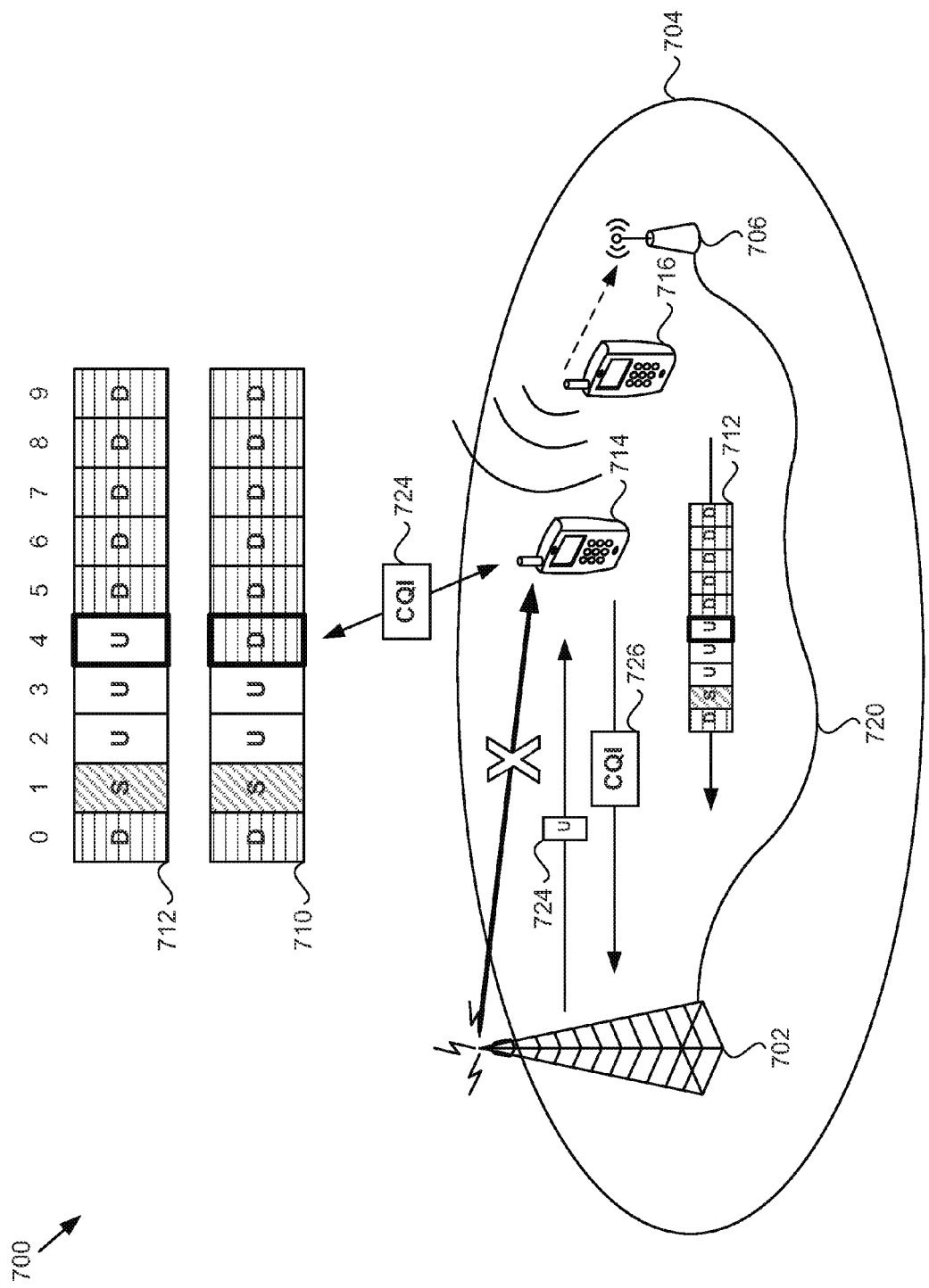
FIG. 7 is a block diagram illustrating the provisioning of information indicating time slots on which to perform sub-frame specific measurements and the performance and relay of those measurements in accordance with another example.

FIG. 7 illustrates an approach 700 for avoiding the inefficiency of treating every DL receiving UE as potentially receiving interference from UL transmitting UEs based on sub-frame specific interference measurements performed by one or more UEs potentially subject to interference. In FIG. 7, a high power node, such as an MCN 702—in alternative embodiments the MCN can be an LPN—is in communication with an LPN 706 in a portion of its coverage area 704 by means of a backhaul link 720. The backhaul link, as with all other backhaul links in this application, can be a fiber optic cable, coaxial cable, or other type of low-latency link, as can be appreciated.

In the example of FIG. 7, the LPN 706 can communicate its TDD configuration 712 over the backhaul link 720. The MCN 702 can receive the TDD configuration of the LPN and compare it with the MCN's own TDD configuration 710. The MCN can identify a set of sub-frames, i.e., sub-frame 4 in TDD configurations 710 and 712 in FIG. 7, with differing directions of transmission at the same time/frequency on which to perform measurements. The MCN can also request that one or more DL receiving UEs 714 perform sub-frame specific measurements on sub-frames within the set of sub-frames on which there is a potential for interference due to conflicting transmission directions, such as the identified sub-frames 724. The MCN then receives these sub-frame specific measurements from the one or more DL receiving UEs.

In some embodiments, the measurements performed by the DL receiving UEs 714 can comprise a Chanel Quality Indicator (CQI) measurement 726. However other types of measurements, such as Channel State Information (CSI) are also possible. Although CQI measurements can already be scheduled to be performed across an entire frame, averaging values for individual sub-frames, in embodiments that employ one or more CQI measurements, the MCN 702 can request that one or more additional sub-frame specific CQI measurements be performed. As shown in FIG. 7, the one or more CQI measurements are performed on the sub-frames, such as sub-frame 4 in FIG. 7, which have differing transmission directions for UL and DL transmissions during the sub-frame. The MCN can then receive the one or more CQI measurements from the DL receiving UEs.

The MCN 702 can then use the one or more CQI measurements 726 to avoid scheduling DL transmission to a particular UE during one or more selected sub-frames where the sub-frame interference measurement from that UE is above a threshold level during those selected sub-frames. When the interference between a UL signal from an adjacent UE and a DL signal from an LPN or MCN is not above the threshold level, the MCN can schedule DL transmission despite conflicting TDD configurations for a given sub-frame at a selected UE. The MCN can make its scheduling determinations based on measurements from one UE or multiple UEs. The MCN can make its requests with sufficient frequency to adapt in real time to changing interference levels at different UEs due to responses to changing directional traffic loads at various adjacent eNodeBs. Different processes can also be applied to address various types of interference arising due do differing TDD configurations at one or more adjacent eNodeBs.

Figure 8:
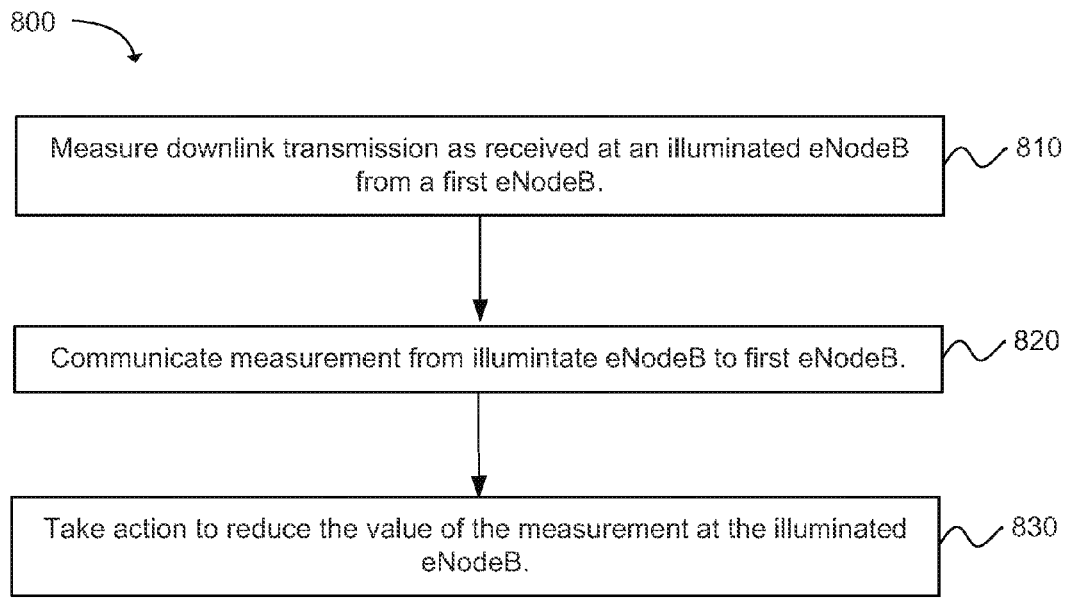
FIG. 8 is a flowchart depicting a process for measuring a DL transmission at an illuminated eNodeB to reduce interference in the presence of differing TDD configurations in accordance with another example.

FIG. 8 depicts a process 800 for mitigating interference from DL transmission with measurements at an illuminated eNodeB. The method comprises measuring 810 a DL transmission transmitted from a first eNodeB as the DL transmission is received at an illuminated eNodeB. Additionally, the first eNodeB communicates 820 one or more measurements from the illuminated eNodeB to the first eNodeB. The first eNodeB then takes an action 830 to reduce interference in terms of the value of the measurement at the illuminated eNodeB.

Figure 9:
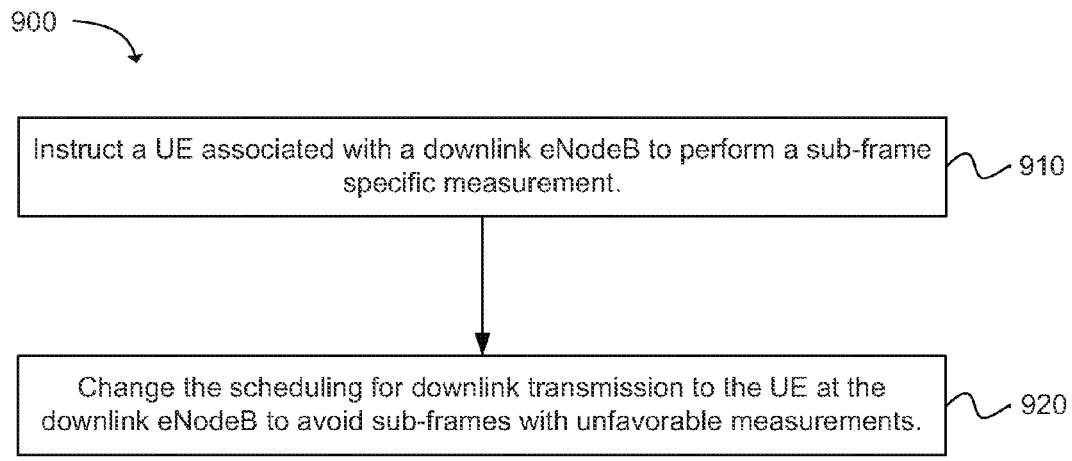
FIG. 9 is a flowchart depicting a process for requesting time-slot specific measurements to determine and respond to interference on a UE receiving a DL transmission from a UE transmitting a UL transmission in accordance with another example.

FIG. 9 depicts a process 900 for mitigating interference from UL transmission with measurements on one or more potentially affected UEs. The method comprises instructing 910, by a DL transmit eNodeB, one or more UEs associated with the eNodeB to perform sub-frame specific measurements. The requested sub-frame measurements can be requested for sub-frames with different transmission directions at adjacent eNodeBs. Additionally, the DL transmit eNodeB changes 920 the scheduling for DL transmission to at least one UE to avoid sub-frames with unfavorable measurements from the UEs responsible for those measurements. In addition to various processes, different devices can be applied to address asymmetric TDD interference.

Figure 10:
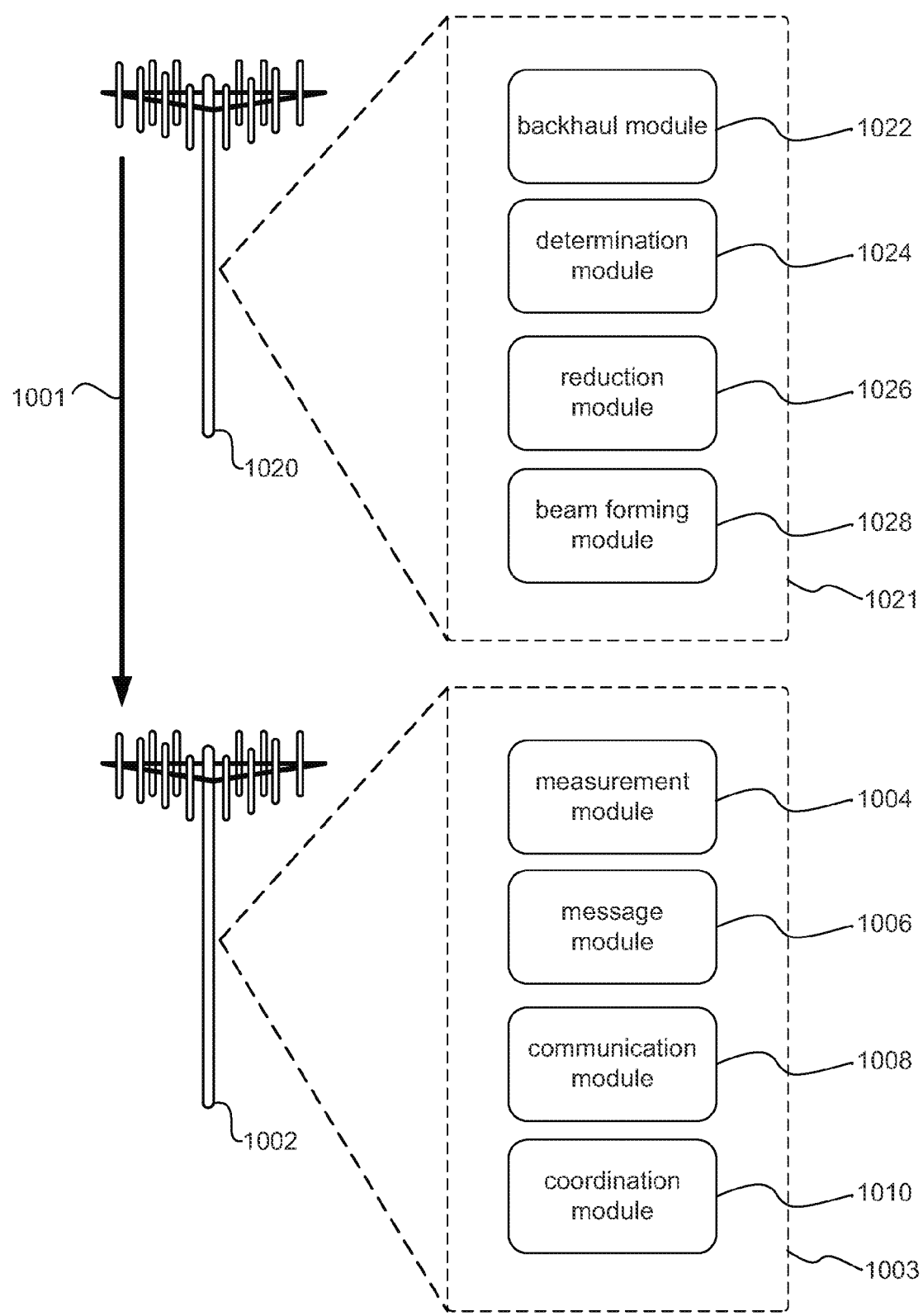
FIG. 10 is a block diagram depicting devices at both a DL eNodeB and an illuminated eNodeB that can be used in the process of measuring the potential for DL interference and taking action to avoid the interference, where the two eNodeBs have differing TDD configurations, in accordance with another example.

FIG. 10 depict a device 1021 at a transmit eNodeB 1020 and a device 1003 at an illuminated eNodeB 1002. Each eNodeB can be configured to be capable of assisting to reduce interference that is caused by a DL transmission 1001 in an asymmetric TDD environment. The device 1003 at the illuminated eNodeB, which can be considered a first eNodeB, comprises a measurement module 1004, a message module 1006, and a communication module 1008. The measurement module can be configured to measure interference from the DL transmission. The DL transmission can be from the transmitting, or second eNodeB 1020. The DL transmission can be measured as received at the first/illuminated eNodeB 1002.

In communication with the measurement module 1004, the message module 1006 can be configured to generate an interference message. The interference message can indicate a need for the second/transmit eNodeB 1020 to reduce interference during a selected TDD sub-frame by providing any of the forms of information discussed with respect to other figures herein and/or known to those of ordinary skill in the relevant art. The interference can be reduced by, for example, by changing a scheduling pattern. The interference can also be reduced by a beam pattern with a reduced radiated power level in a direction from the second/transmit eNodeB to the first/illuminated eNodeB, or any other approaches discussed with respect to other figures herein and/or known to those of ordinary skill in the relevant art. The interference message can also carry information that can be used by the second/transmit eNodeB 1020 to assist in the reduction of the interference. The type of information will be discussed in the proceeding paragraphs.

Additionally, in communication with the message module 1006, the communication module 1008 can be configured to communicate the interference message. The communication module can communicate the interference message from the first/illuminated eNodeB to the second/transmit eNodeB. The interference message can enable the second/transmit eNodeB to reduce interference received at the first/illuminated eNodeB.

In certain embodiments, the measurement module 1004 can measure the channel state information by measuring one or more reference signals. These reference signals can comprise Channel State Information Reference Signals (CSI-RS) and/or Cell-specific Reference Signals (CRS). The interference message, in some embodiments, can include any of a channel measurement such as a reference signal received power, a quantized principle eigen vector(s) of an estimated channel, and a pre-coding matrix indicator of a codebook, and so forth.

In some embodiments, the communication module 1008 can also be configured to receive measurement information. The measurement information can provide information about a set of RSs in the DL transmission from the second eNodeB. The measurement information can be used to find the set of RSs and measure the channel state information of the DL transmission from the second eNodeB 1020 as received at the first eNodeB 1002.

A coordination module 1010 can also be included in some embodiments, which is in communication with the measurement module 1004. The coordination module can be configured to request a UE associated with the first eNodeB to reduce a transmission power. The UE can be requested to reduce power for UL transmission during measurement of the DL transmission from the second eNodeB as it is received at the first eNodeB. In this way, the impact from the UL transmission from the UE can be mitigated during measurement.

In such embodiments, the coordination module 1010 can request the UE to reduce the transmission power by requesting the UE to mute the transmission power for the UL transmission for a first set of REs. These REs can have substantially similar transmission times and sub-carriers as those of a second set of REs to be measured by the measurement module 1004 at the first/illuminated eNodeB 1002. In additional embodiments, the communication module 1008 can also be configured to send TDD configuration information for the first/illuminated eNodeB to the second/transmit eNodeB 1020. The TDD configuration sent to the second eNodeB can allow the second eNodeB to not transmit DL information and/or reduce transmission power at selected sub-frame(s), selected PRBs, selected OFDM/SC-FDMA symbols or selected REs in a subframe, when the first eNodeB is receiving UL information at the subframe/REs.

Additionally, in some embodiments, the measurement module 1004 can perform a series of measurements of the DL transmission. The message module 1006 can generate a series of interference messages. And, the communication module 1008 can send the series of interference messages.

All of these actions are taken with sufficient frequency to allow the second eNodeB to adapt to changing traffic loads configurations at the first eNodeB in real time.

With respect to the second/transmit eNodeB 1020, the device 1021 thereon can include a backhaul module 1022, a determination module 1024, and a reduction module 1026. The backhaul module can be configured to receive interference information from an illuminated eNodeB 1002. The interference information can provide information about channel state information for the DL transmission 1001 from the transmit eNodeB as received at the illuminated eNodeB.

In communication with the backhaul module 1022, the determination module 1024 can be configured to determine an interference reduction action. The determination module determines the interference action based on the interference information received by the backhaul module. The reduction module 1026, which can be in communication with the determination module, can be configured to take the interference reduction action. The reduction module takes the interference reduction action upon a determination by the determination module that the interference reduction action is appropriate.

In some embodiments, the reduction action can comprise scheduling DL transmission sub-frames at the transmit eNodeB. The DL transmission sub-frames can be scheduled to avoid DL interference on UL transmissions at the illuminated eNodeB. In some embodiments, the backhaul module 1022 further receives TDD configuration information for the illuminated eNodeB. This information can be used in scheduling DL transmission at times that do not interfere with reception of UL transmission at the illuminated eNodeB.

A beam forming module 1028, in communication with the reduction module 1026, can also be included in some embodiments. The beam forming module can be configured to form a beam for the DL transmission. The beam can have a reduced radiated power in a direction from the second/transmit eNodeB 1020 to the first/illuminated eNodeB 1002 at times, such as TDD sub-frames and/or REs within those TDD subframes that interfere with reception of UL transmission at the first/illuminated eNodeB. In such embodiments, the beam forming module can use zero-forcing, Minimum Mean Squared Error (MMSE), Signal-to-Leakage-and-Noise Ratio (SLNR), and/or Signal to Interference plus Noise Ratio (SINR) to reduce radiated power in the direction from the second/transmit eNodeB to the first/illuminated eNodeB during the selected TD subframes when interference may occur to due to the use of different TDD configurations by the two eNodeBs 1002 and 1020, and or UEs configured to communicate with the eNodeBs.

Depending on the embodiment, the second/transmit eNodeB 1020 and/or the first/illuminated eNodeB 1002 can be any of a high power eNodeB and a low power eNodeB. Also, in certain embodiments, the backhaul module 1022 can be configured to respond to a series of interference messages. The backhaul module can respond with sufficient frequency to allow the transmit eNodeB to adapt to changing traffic loads and changing TDD configurations at the illuminated eNodeB in real time.

While the devices 1003, 1021 are illustrated in FIG. 10 as being located on the respective eNodeBs 1002, 1020, this is not intended to be limiting. The devices 1003, 1021 may be at a disparate location from the eNodeBs and may be configured to communicate with the eNodeBs. For example, the devices may be located in the Evolved Packet Core (EPC) that is in communication with the Radio Access Network (RAN) in which the eNodeBs are located.

Figure 11:
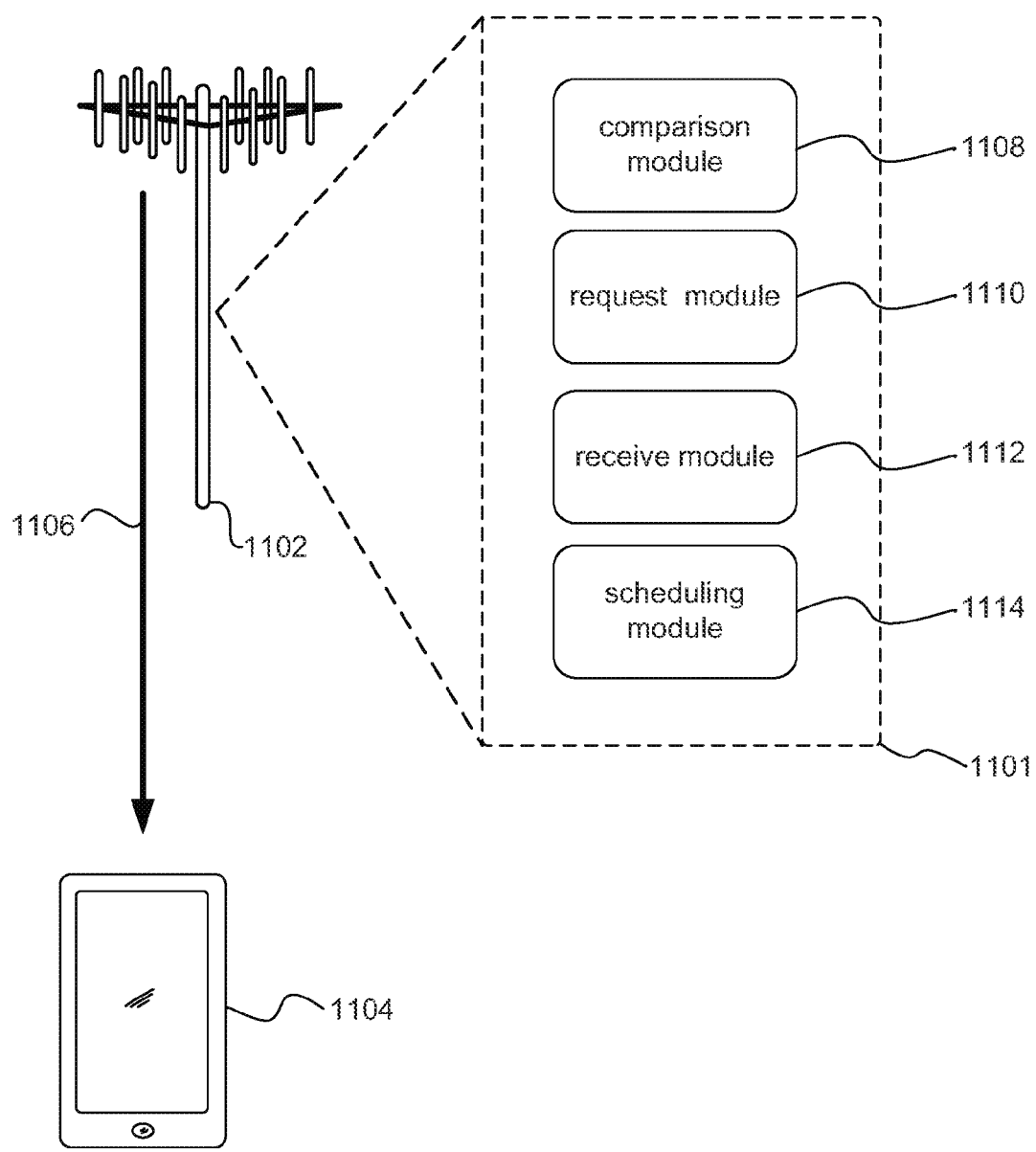
FIG. 11 is a block diagram illustrating a device operating at an eNodeB to coordinate the performance of sub-frame specific measurements at a UE receiving DL transmission associated with the eNodeB to determine and respond to interference on a UE as caused by UL transmission from another UE to another eNodeB in accordance with another example.

FIG. 11 depicts a device 1101 at a DL eNodeB 1102 capable of reducing interference from an UL transmission in an asymmetric TDD environment. Associated with the DL eNodeB is a UE 1104 for which a portion of DL transmission 1106 is intended. The device can include a comparison module 1108, a request module 1110, a receive module 1112, and a scheduling module 1114. The comparison module can be configured to compare a first TDD configuration at the DL eNodeB with a second TDD configuration at a UL eNodeB. Reference throughout this specification to a "UL eNodeB" means an eNodeB that receives UL transmission from one or more associated UEs, where the UL transmission can potentially experience interference from DL transmission from another eNodeB. Additionally, the comparison module can be configured to identify a potentially interfering sub-frame. The identified sub-frame has a potential to cause interference due to differing UL and DL configurations between the first TDD configuration and the second TDD configuration.

The request module 1110, which can be in communication with the comparison module 1108, can be configured to request that the UE 1104 receiving the DL transmission 1106 associated with the first TDD configuration perform a sub-frame specific interference measurement. The sub-frame specific interference measurement can be performed on the potentially interfering sub-frame identified by the comparison module. Additionally, the request module can be configured to receive the sub-frame specific interference measurement from the UE. In certain embodiments, the request module requests a CQI measurement specific to the potentially interfering sub-frame.

A receive module 1112 can be included is some embodiments, which can be in communication with the comparison module 1108. The receive module can be configured to receive information about the second TDD configuration. In additional embodiments, the request module 1110 can provide a series of requests for sub-frame specific interference measurements at the UE 1104 with sufficient frequency to adapt to changing interference levels at the UE in real time.

Additionally, a scheduling module 1114, can be included in some embodiments. The scheduling module can be in communication with the request module 1110. The scheduling module can be configured to avoid scheduling DL transmission to the UE on the potentially interfering sub-frame where the sub-frame specific interference measurement is above a threshold level. The threshold level can be set to satisfy a particular Quality of Service (QoS), or other quality control metric set forth in a specification standard corresponding to the relevant embodiment. In certain embodiments, the scheduling module makes scheduling decisions based on a plurality of sub-frame specific interference measurements for a plurality of UEs.

Figure 12:
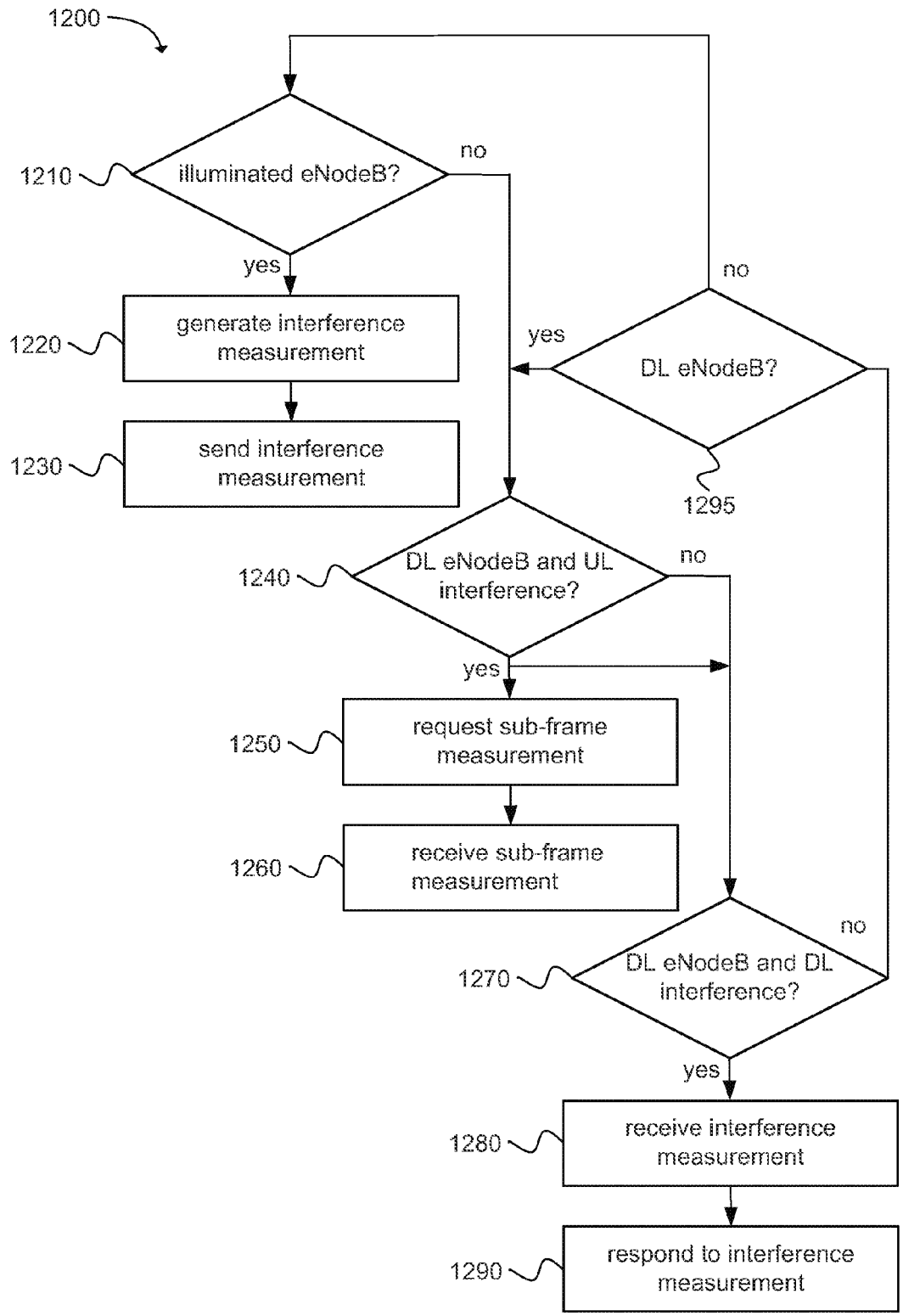
FIG. 12 is a flowchart depicting another generalized process to mitigate various types of potential interference resulting from asynchronous TDD configurations in accordance with another example.

FIG. 12 depicts a flow chart of a method 1200 for mitigating interference in a TDD environment between UL and DL transmissions associated with multiple eNodeBs. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method can comprise taking a first action and a second action with respect to at least one interference measurement. The first action and second action follow on the basis of a decision chain. The decision chain first determines 1210 whether the method is implemented at an illuminated/UL eNodeB. An illuminated/UL eNodeB is an eNodeB that receives an uplink signal from a UE and a downlink signal from an adjacent eNodeB within a single TDD subframe. As previously discussed, the downlink signal can interfere with the uplink signal received from the UE. In certain embodiments, the method can be accomplished by performing measurements to identify signal strengths from DL transmissions from one or more adjacent eNodeBs that are received at the illuminated eNodeB. In such embodiments, where a signal is measured with a strength above a certain threshold, indicating that the signal can have an effect on some quality control metric, a determination can be made that the method is implemented at an illuminated/UL eNodeB. In an additional approach for determining if the method is implemented at an illuminated/UL eNodeB, the determination can be based on the method being implemented during a period of time allotted for UL reception.

Where the determination 1210 is made that the method 1200 is being implemented on an illuminated/UL eNodeB, the first action is taken by generating 1220 one or more interference measurements. The interference measurements are generated at the illuminated/UL eNodeB configured for UL reception from UEs. The interference measurements can provide information about a measurement of a DL transmission from an adjacent eNodeB, referred to as a DL eNodeB, that is received at the illuminated/UL eNodeB. The second action is then taken by sending 1230 the interference measurements from the illuminated eNodeB to the DL eNodeB.

Where the determination 1210 is that the method 1200 is not implemented on an illuminated/UL eNodeB, a determination 1240 is made as to whether the method is implemented on a transmit/DL eNodeB. The transmit/DL eNodeB is an eNodeB that sends a DL transmission to a UE, but the UE has difficulty receiving the DL transmission due to interference from an adjacent UE sending an UL transmission. In some embodiments, the method can be assumed to be implemented on a transmit/DL eNodeB where it is not implemented on an illuminated/UL eNodeB. In additional embodiments, an affirmative determination can be reached based on the method being implemented during a period of time allotted for DL transmission. The potential for interference at a UE from UL transmissions of an adjacent UE can be assumed, or can be made based on TDD configurations from one or more adjacent eNodeBs and/or reports of numbers of UEs associated with those eNodeBs. These TDD configurations and reports can be collected at the illuminated eNodeB and communicated to the transmit/DL eNodeB from the illuminated eNodeB over one or more backhaul links.

Where an affirmative determination 1240 is reached that the method 1200 is implemented on a transmit/DL eNodeB and there is a potential for interference at a UE configured to receive a DL transmission with UL transmissions from an adjacent UE performing UL transmission to an additional, adjacent UL eNodeB, the first action is taken based on this determination. In such cases, the first action comprises requesting 1250, by the DL eNodeB, a sub-frame measurement from a DL-UE associated with the DL eNodeB. The sub-frame measurement can measure interference at the DL-UE from an UL transmission from an UL-UE associated with the adjacent UL eNodeB. The second action can then be taken, which can be receiving 1260 the sub-frame measurement from the DL-UE at the transmit/DL eNodeB.

Where there is a determination 1240 that the method 1200 is implemented on a DL eNodeB, but there is not a concern that there is a possibility for interference from UL transmissions, a determination 1270 is made about a possibility for DL interference. The determination of a DL interference potential can be assumed and/or it can be reached upon receiving 1280 an interference measurement. One or more interference measurements can be received by the transmit/DL enodeB from the illuminated/UL eNodeB. Receiving the interference measurements can constitute the first action. The second action can comprise responding 1290 to the one or more interference measurements at the transmit/DL eNodeB. As previously discussed, the response can include reducing a transmit power or muting selected sub-frames and/or REs in a subframe that are causing interference at the illuminated eNodeB during a TDD subframe. The reduction in power can also be accomplished by using beam forming to reduce the power of the downlink signal that is received at the illuminated eNodeB.

In some cases, determination about the possibility of DL interference can be made even where an affirmative determination 1240 has been made about the possibility of UL interference, where the method is implemented on a transmit eNodeB. Where no affirmative determination is made on any of the three determinations 1210, 1240, 1270, the method can continue by returning to the first determination 1210. Where a determination 1295 has been made that at least the method is implemented on a transmit/DL eNodeB, the method can also continue by returning to the second determination 1240.

In some embodiments, the first action of generating 1220 one or more interference messages can further comprise measuring, at the illuminated/UL eNodeB some channel state information. The cannel state information can be derived from the DL transmission from the transmit/DL eNodeB, as received at the UL eNodeB. In such embodiments, the second action can further comprise sending the one or more interference measurements from the illuminated/UL eNodeB to the transmit/DL eNodeB.

In some embodiments, the second action of responding 1290 to an interference message can comprise reducing interference at the UL eNodeB by making changes in a schedule for DL transmissions from the transmit/DL eNodeB. The interference can also be reduced by forming a beam pattern for DL transmissions with a reduced radiated power in a direction from the transmit/DL eNodeB to the illuminated/UL eNodeB.

Also, in certain embodiments, where sub-frame/time-slot specific measurements are requested to address interference from UL transmissions, the one or more sub-frame measurements can pertain to a specific sub-frame configured for DL transmission at the transmit/DL eNodeB and illuminated/UL transmission at the UL eNodeB. In additional embodiments, the specific sub-frame configured for DL transmission at the transmit/DL eNodeB and UL transmission at the illuminated/UL eNodeB can be determined by comparing a TDD configuration at both the DL eNodeB and the UL eNodeB. Such embodiments, can further include scheduling DL transmission from the transmit/DL eNodeB to one ore more DL-UEs to mitigate interference in the specific sub-frame for which the sub-frame measurement was made.

In embodiments of the method 1200 implemented on a computer program product, the non-transitory computer usable medium with computer readable program code can reside at a transmit/DL eNodeB, an illuminated/UL eNodeB, and/or a network level. Where the computer program product resides at the network level, multiple instances of the method can be implemented simultaneously. In such cases the method can be implemented as if the conditions of any number of the three determinations 1210, 1240, and 1270 are valid.

Figure 13:
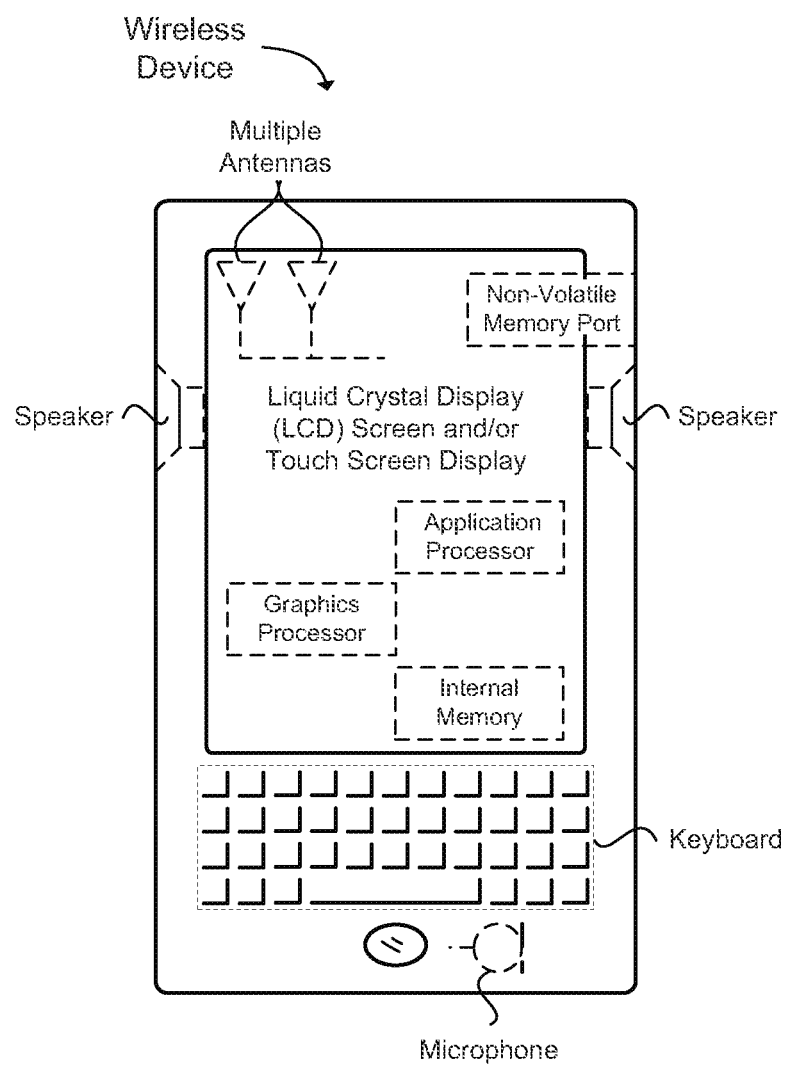
FIG. 13 is a block diagram of a UE in accordance with another example.

FIG. 13 provides an example illustration of a mobile device, such as UE, a mobile station (MS), a mobile wireless device, a mobile communication device, a tablet, a handset, or other type of mobile wireless device. The mobile device can include one or more antennas configured to communicate with a base station (BS), an eNodeB, or other type of wireless wide area network (WWAN) access point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 13 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device for reducing interference between a downlink and an uplink of two evolved Node Bs, comprising:
a measurement module, operating at a first evolved Node B (eNodeB), configured to measure a channel state information of a Down Link (DL) transmission from a second eNodeB as received at the first eNodeB;
a message module, in communication with the measurement module and operating at the first eNodeB, configured to generate an interference message indicating a need for the second eNodeB to reduce interference according to at least one of a scheduling pattern and a beam pattern with a reduced radiated power in a direction from the second eNodeB to the first eNodeB and carrying information to assist to reduce the interference, wherein the interference is from the second eNodeB to the first eNodeB;
a communication module, in communication with the message module and operating at the first eNodeB, configured to communicate the interference message from the first eNodeB to the second eNodeB to enable the second eNodeB to reduce interference received at the first eNodeB; and
a coordination module, in communication with the measurement module and operating at the first eNodeB, configured to request a User Equipment (UE) associated with the first eNodeB to reduce a transmission power for an UpLink (UL) transmission during measurement of the DL transmission from the second eNodeB as the DL transmission from the second eNodeB is received at the first eNodeB so that an impact from the UL transmission from the UE is mitigated during measurement.

2. The device of claim 1, wherein the measurement module measures the channel state information of the DL transmission from the second eNodeB as received at the first eNodeB by measuring at least one reference signal, wherein the at least one reference signal can comprise at least one of a Channel State Information Reference Signal (CSI-RS) and a Cell-specific Reference Signal (CRS).

3. The device of claim 1, wherein the interference message includes at least one of a channel measurement, a reference signal received power, a quantized principle eigenvector(s) of an estimated channel, and a precoding matrix indicator of a codebook.

4. The device of claim 1, wherein the communication module is further configured to receive measurement information about a set of reference signals (RS) in the DL transmission from the second eNodeB, wherein the measurement information is used to find the set of RSs and measure the channel state information of the DL transmission from the second eNodeB as received at the first eNodeB.

5. The device of claim 1, wherein the coordination module requests the UE to reduce the transmission power for the UL transmission during measurement of the DL transmission by requesting the UE to mute the transmission power for the UL transmission for a first set of Resource Elements (RE) with substantially similar transmission times and sub-carriers as those of a second set of resource elements to be measured by the measurement module.

6. The device of claim 1, wherein the communication module is further configured to send Time Division Duplexing (TDD) configuration information for the first eNodeB to allow the second eNodeB to do at least one of not transmit DL information and reduce transmission power when the first eNodeB is receiving UL information.

7. The device of claim 1, wherein the measurement module performs a series of measurements of the DL transmission, the message module generates a series of interference messages, and the communication module sends the series of interference messages with sufficient frequency to allow the second eNodeB to adapt to changing traffic loads and Time Division Duplexing (TDD) configurations at the first eNodeB in real time.

8. A device for reducing interference between a downlink and an uplink of two evolved Node Bs, comprising:
a backhaul module, operating at a transmit evolved Node B (eNodeB), configured to receive interference information from an illuminated eNodeB, the interference information providing information about a channel state information of a (DL) DownLink transmission from the transmit eNodeB as received at the illuminated eNodeB, wherein the interference information provides information about interference from the transmit eNodeB to the illuminated eNodeB;
a determination module, in communication with the backhaul module and operating at the transmit eNodeB, configured to determine an interference reduction action based on the interference information received by the backhaul module;
a reduction module, in communication with the determination module and operating at the transmit eNodeB, configured to take the interference reduction action upon a determination by the determination module that the interference reduction action is appropriate; and
a beam forming module, in communication with the reduction module and operating at the transmit eNodeB, configured to form a beam for the DL transmission with a reduced radiated power in a direction from the transmit eNodeB to the illuminated eNodeB at times that interfere with reception of UL transmission at the illuminated eNodeB.

9. The device of claim 8, wherein the interference reduction action comprises scheduling DL transmission subframes at the transmit eNodeB to avoid DL interference reception on UpLink (UL) transmissions at the illuminated eNodeB.

10. The device of claim 9, wherein the backhaul module further receives Time Division Duplexing (TDD) configuration information for the illuminated eNodeB to use in scheduling DL transmission at times that do not interfere with reception of UL transmission at the illuminated eNodeB.

11. The device of claim 8, wherein the beam forming module uses at least one of Zero-Forcing, Minimum Mean Squared Error (MMSE), Signal-to-Leakage-and-Noise Ratio (SLNR), and Signal to Interference plus Noise Ratio (SINR) to form the reduced radiated power in the direction from the transmit eNodeB to the illuminated eNodeB.

12. The device of claim 8, wherein the transmit eNodeB and the illuminated eNodeB are any of a high power eNodeB and a low power eNodeB.

13. The device of claim 8, wherein the backhaul module is configured to respond to a series of interference messages with sufficient frequency to allow the transmit eNodeB to adapt to changing traffic loads and changing Time Division Duplexing (TDD) configurations at the illuminated eNodeB in real time.

14. A device for reducing interference between uplink transmission and downlink reception of two User Equipments in a wireless network, comprising:
 a comparison module, operating at a DownLink (DL) evolved Node B (eNodeB), configured to:
  compare a first Time Division Duplexing (TDD) configuration at the DL eNodeB with a second TDD configuration at an UpLink (UL) eNodeB, and
  identify a potentially interfering sub-frame due to differing UL and DL configurations between the first TDD configuration and the second TDD configuration; and
 a request module, in communication with the comparison module and operating at the DL eNodeB, configured to:
  request that a User Equipment (UE) receiving a DL transmission associated with the first TDD configuration perform a sub-frame specific interference measurement on the potentially interfering sub-frame identified by the comparison module, and
  receive the sub-frame specific interference measurement from the UE; and
 a scheduling module, in communication with the request module and operating at the DL eNodeB, configured to avoid scheduling DL transmission to the UE on the potentially interfering sub-frame where the sub-frame specific interference measurement is above a threshold level.

15. The device of claim 14, wherein the request module requests a Channel Quality Indicator (CQI) specific to the potentially interfering sub-frame.

16. The device of claim 14, further comprising a receive module, in communication with the comparison module and operating at the DL eNodeB, configured to receive information about the second TDD configuration.

17. The device of claim 14, wherein the scheduling module makes scheduling decisions based on a plurality of sub-frame specific interference measurements for a plurality of UEs.

18. The device of claim 14, wherein the request module provides a series of requests for sub-frame specific interference measurements with sufficient frequency to adapt to changing interference levels at the UE in real time.

19. A computer program product comprising a non-transitory computer usable medium having a computer readable program code embodied therein, the computer readable program code adapted to be executed to implement instructions for a method for mitigating interference in a Time Division Duplexing (TDD) environment between uplink and downlink transmissions associated with multiple evolved Node Bs, comprising:
 taking a first action with respect to at least one interference measurement, wherein the interference measurement measures interference between the multiple evolved Node Bs, and wherein the first action comprises receiving the at least one interference measurement at the DL eNodeB from the UL eNodeB and wherein the first action further comprises at least one of:
  generating the at least one interference measurement at an UpLink (UL) eNodeB configured for UL reception, wherein the at least one interference measurement provides information about a measurement of a DownLink (DL) transmission from a DL eNodeB configured for DL transmission as received at the UL eNodeB,
  receiving the at least one interference measurement at the DL eNodeB from the UL eNodeB, and
  requesting, by the DL eNodeB, a sub-frame measurement from a DL-UE associated with the DL eNodeB, the sub-frame measurement measuring interference at the DL-UE from an UL transmission from an UL-UE associated with the UL eNodeB; and
 taking a second action with respect to the at least one interference measurement, wherein the at least one interference measurement measures interference between the UL eNodeB and the DL eNodeB, and wherein the second action further comprises responding to the at least one interference message, responding to the at least one interference message further comprising reducing interference at the UL eNodeB by at least one of making changes in a schedule for DL transmissions from the DL eNodeB and forming a beam pattern for DL transmissions with a reduced radiated power in a direction from the DL eNodeB to the UL eNodeB and wherein the second action further comprises at least one of:
 sending the at least one interference measurement from the UL eNodeB to the DL eNodeB,
 responding to the at least one interference measurement at the DL eNodeB, and
 receiving the sub-frame measurement from the DL-UE at the DL eNodeB.

20. The computer program product of claim 19, wherein:
 the first action comprises generating the at least one interference message and generating the at least one interference message further comprises measuring, at the UL eNodeB, a channel state information of the DL transmission from the DL eNodeB as received at the UL eNodeB, and
 the second action further comprises sending the at least one interference measurement from the UL eNodeB to the DL eNodeB.

21. The computer program product of claim 19, wherein the sub-frame measurement pertains to a specific sub-frame configured for DL transmission at the DL eNodeB and UL transmission at the UL eNodeB.

22. The computer program product of claim 21, further comprising determining the specific sub-frame configured for DL transmission at the DL eNodeB and UL transmission at the UL eNodeB by comparing a Time Division Duplexing (TDD) configuration at both the DL eNodeB and the UL eNodeB.

23. The computer program product of claim 22, further comprising scheduling DL transmission from the DL eNodeB to the DL-UE to mitigate interference in the specific sub-frame for which the sub-frame measurement was made.

24. The computer program product of claim 19, wherein the non-transitory computer usable medium having a computer readable program code embodied therein resides at, at least one of the DL eNodeB, the UL eNodeB, and a network level.

* * * * *